Patented Dec. 6, 1938

2,139,139

UNITED STATES PATENT OFFICE 2,139,139

FOOD PRODUCT FOR TREATMENT OF INFANTILE DIARRHEA

Charles A. Tompkins, Indianapolis, Ind., assignor to Mead Johnson & Company, Evansville, Ind., a corporation of Indiana No Drawing. Application February 8, 1936, Serial No. 62,989

2 Claims. (Cl. 167—55)

This invention relates to specially prepared food products for treatment of infantile diarrhea. Infantile diarrhea is the most common cause of death in the early months of life. Until the present time starvation has probably been a basic principle in all previous therapy for infantile diarrheas. This has been a serious problem in cases of inanition.

Before the present invention, apple therapy was believed to be the best means at hand to control frequent stools; but this treatment is not without disadvantages.

The object of this invention is to produce a food product suitable for infant diets, containing the active therapeutic principle or agent for treatment of infantile diarrhea heretofore recognized as embodied in apples and certain other fruits; a product which preferably has good keeping qualities and high vitamin and caloric contents, and also preferably in concentrated form.

My invention is the result of extended experiments and studies directed to determining the active therapeutic principle or agent in apples and other fruits which have proven beneficial in the treatment of infantile diarrhea, and to the incorporation of such agent in a food product suitable for infant diets, whereby the disadvantages of apple therapy are overcome; and a suitable vehicle for the therapeutic principle and nutritive elements of the product are provided.

Prior to my invention, tannic acid, malic acid, and the fruit acids were given credit for some of the good effects obtained from apple in the treatment of infantile diarrhea. However, tannic acid is only present in sixty-eight thousandths percent, and is dissociated in the small intestine. Fruit acids are present in only fifty-nine hundredths percent. Tannin proprietary preparations are ineffective in the treatment of infantile diarrhea. In the light of present knowledge the role of the acids in apple is most problematical so far as any curative effect is concerned. The vitamin content of the apple has been considered one of the active principles. Although there is little doubt that most diarrheas have a vitamin deficiency, especially vitamin C, it is questionable whether any vitamin content in the apple has a specific curative action so far as the diarrhea is concerned. It has been suggested that the calcium and magnesium might be a factor. My studies lead to the belief that pectin is the chief therapeutic agent. Currant juice, which contains large amounts of pectin, has been used alone with good results. If a pectinase is given in conjunction with apple, there is no therapeutic effect. Other foods having a high pectin content, but lacking some of the other elements of apples, have been used successfully in the treatment of diarrhea. The action of pectin is attributed to its colloidal and buffer properties; hence its ability to regulate the hydrogen ion concentrate, and bind endogenous and exogenous poisons including amines. The apple is also said to inhibit bacterial growth by being a poor nutrient for the pathogens. The mechanical cleansing through adsorption and absorption is also considered a factor. Cellulose along with the pectin is responsible for the absorptive and adsorptive properties. The usefulness of the cellulose, however, is minimized when one considers the good results with currant juice, which contains much pectin but no cellulose. The use of pure pectin, however, is not desirable, inasmuch as it lacks nutriment, is not palatable, and does not satisfy hunger.

Having determined by extended experimentation that pectin is the active principle in apple useful for the treatment of infantile diarrhea, consideration was given to the selection of a suitable vehicle for the pectin. I conceived the idea that a cellulose substance in finely ground form, readily soluble, was desired. Agar-agar, which does not melt at body temperature was chosen. It has the advantage of furnishing a gel of any desired consistency and its gel state is retained as it passes through the gastro-intestinal tract.

For furnishing caloric value and nutrition, a maltose and dextrin preparation known as "Dextri-Maltose", the trade-mark of Mead Johnson & Company, is mixed with the pectin and agar-agar.

Preferably 100 grade acid free pectin, obtainable from citrous fruits or apples, is preferably used. By "100 grade" is meant that one pound of pectin will jell one hundred pounds of sugar. Pectin of the character recommended will have approximately the following analysis:

| | |
|---|---:|
| Moisture | 8.00 |
| Pectin | 45.98 |
| Glycerine | 17.62 |
| Reducing sugars | 28.40 |

The formula of my product was designed to contain pectin in about three times the amount found in apple, and is approximately as follows:

| | Grams |
|---|---:|
| "Dextri-Maltose" | 175 |
| Pectin | 6 |
| Agar-agar | 8 |

These substances form a dry mixture. The agar-pectin ratio is such that when a pint of milk or water is added to the above preparation, a smooth self-supporting gel results. The water or milk is boiled with the product over an open flame for from three to five minutes. The formula constitutes a day's feeding on a three hour schedule. If the preparation is made of water, the total calories will be 700; if made of whole milk, the total calories will be 1020. This represents a highly concentrated food, as each feeding represents about two to three tablespoonsful. For older children, the proportions can be increased by one-half. The feeding can be made even more concentrated by using powdered milk and decreasing the milk or water.

The product described overcomes the objections to feeding apples to infants suffering from diarrhea. Its gel state is retained as it passes through the gastro-intestinal tract. It contains a liberal proportion of pectin, in combination with the nutritive element required for infants' diets. The product is preferably non-hydroscopic and convenient to use.

Obviously the therapeutic properties of this invention may be obtained by combining the pectin and a carrier, such as agar-agar or other cellulose material, but the addition of maltose and dextrin provides a food product efficient for its intended purposes. The invention produces a new therapeutic and a new physical result.

My product is better taken by infants than is apple, and its ability to control a diarrhea and promote weight gain simultaneously is an important factor. It is much more adaptable to given cases than apple. The preparation can be given in small or large bulk; in firm or soft gels; in concentrated or dilute feedings; and carbohydrate, fat, protein, and vitamin contents can be altered to suit the case. It is very economical in original costs, and waste is less likely than in apple. It carries within itself a good source of calories. It is extremely easy to prepare and much more convenient to manage from a nursing point of view, as it is no easy matter to scrape apples for a large group of infants on a three hour schedule. The prepared gel keeps indefinitely in an ice box, and the powder keeps very well. Apples cannot be given sterile, whereas my product is easily kept sterile after preparation. Feeding raw apples is an unsanitary procedure not compatible with present thought on feeding infants. Apples are not always readily available, especially in rural districts where the fruit is not raised. Quality apples are not harvested until the diarrhea season is nearly over. The period of hospitalization has been shown to be less when my product is used in place of apple.

I claim:

1. A diarrhea controlling product which does not melt at body temperature and which is capable of producing formed stools within twenty-four to forty-eight hours after ingestion, said product comprising pectin, agar-agar and aqueous media in the form of a gel.

2. A gel forming, diarrhea controlling product in its dry state which will form a gel when added to aqueous media and boiled, said product containing as its gel forming constituents pectin and agar-agar.

CHARLES A. TOMPKINS.